Dec. 28, 1965    G. GOTZINGER    3,225,838
COMBINATION SOIL CULTIVATOR AND WEEDER IMPLEMENT
Filed Feb. 21, 1963    2 Sheets-Sheet 1
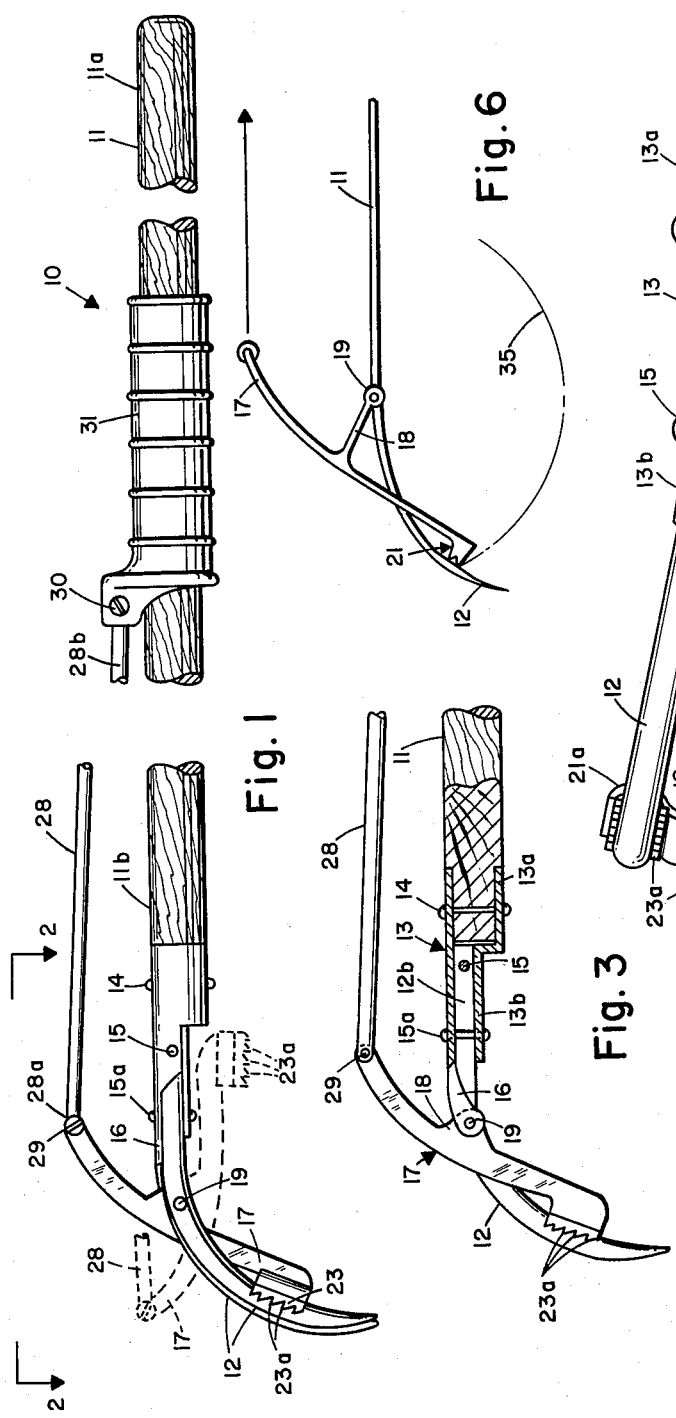
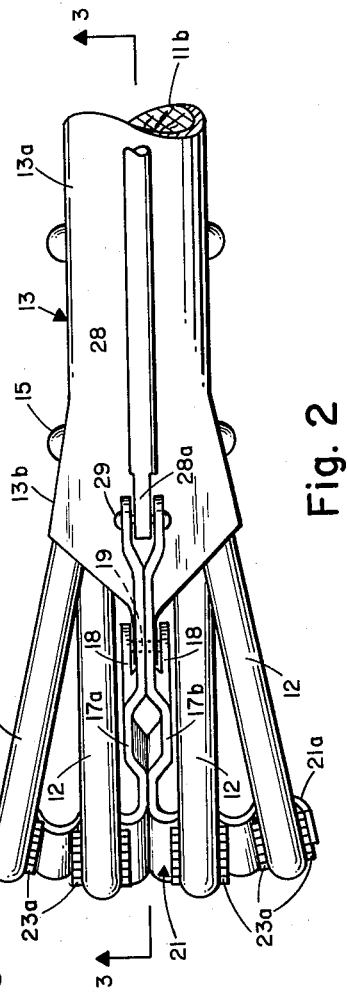
INVENTOR.
GEORGE GOTZINGER
BY
ATTORNEY Dec. 28, 1965  G. GOTZINGER  3,225,838
COMBINATION SOIL CULTIVATOR AND WEEDER IMPLEMENT
Filed Feb. 21, 1963  2 Sheets-Sheet 2

INVENTOR.
GEORGE GOTZINGER
BY
*Roy E. Raney*
ATTORNEY

United States Patent Office 3,225,838
Patented Dec. 28, 1965

3,225,838
COMBINATION SOIL CULTIVATOR AND
WEEDER IMPLEMENT
George Gotzinger, 457 S. Harbor Drive,
Indian Rocks Beach, Fla.
Filed Feb. 21, 1963, Ser. No. 260,175
2 Claims. (Cl. 172—378)

This invention relates to improvements in hand implements for cultivating soil and pulling weeds, and more particularly to an improved combination soil cultivating and weed pulling implement of the type having tines or prongs to break and work soil and having movable jaw means cooperable with the tines to grip weeds therebetween for removal from the soil.

Hand operated soil cultivating and weeder implements have been known heretofore having movable jaw members operable to grip weeds for withdrawal from the earth; however, the gripping jaws of such devices operated with simple pincher-like movements which grip the weeds between surfaces pressed laterally together and the dislodging of the weeds was effected by upward sweep or pull on the implement handle.

According to the present invention a principal object is to provide an improved soil cultivating and weed pulling hand implement comprising a handle having rigid, fixed prongs or tines at one end which may be used to cultivate soil in a conventional manner, and movable jaw means cooperating with the tines and operable by the implement user to grip weeds therebetween, the movement of the jaw means with respect to the tines having a substantial moment longitudinally of the tines so that in gripping the weeds to the tines the jaws wedge the weeds to the tines with an upwardly exerted force tending to forcibly dislodge the weeds from the soil to facilitate their removal by raising the implement.

Another important object of this invention is the provision of a hand operated soil cultivator and weed puller having the aforementioned gripping action and wherein the jaw actuating means produces a greater component of force along the tines than against the tines so that the greater component of the force of the jaws acts to pull the weeds and dislodge them from the soil by the gripping action of the jaws alone.

As another object this invention aims to achieve the foregoing operational characteristics through the use of rigid tines fixedly mounted at the end of an elongated handle and extending laterally thereto, and a jaw carrying lever pivoted to the handle with one end carrying jaw means for cooperation with segments of the tines to grip weeds therebetween and the other end connected to operating means such as a pull rod, the lever being pivoted to the handle at a point with respect to the tines so as to swing the jaws in an arc which intersects the surfaces of the tines engaged by the jaws at an angle substantially less than 90° whereby as the lever is pivoted to move the jaws into closing engagement with the tine structure the jaws move upwardly along the tines toward the line of the axis of the handle and provide a wedging action having the major component of force in a direction to pull weeds from the soil by action of the jaws alone.

The invention may be further said to reside in certain novel combinations and arrangements of parts hereinafter described in conjunction with the accompanying sheets of drawings forming a part of this specification, and in which FIG. 1 is a side elevation of a cultivating and weed pulling implement embodying this invention with portions broken out to shorten the view;

FIG. 2 is an enlarged plan view taken along line 2—2 of FIG. 1;

FIG. 3 is a sectional view taken along line 3—3 of FIG. 2 but on a reduced scale;

FIG. 6 is a diagrammatic view illustrating the improved force and movement characteristics obtained by weed pullers embodying this invention.

Figure 4:
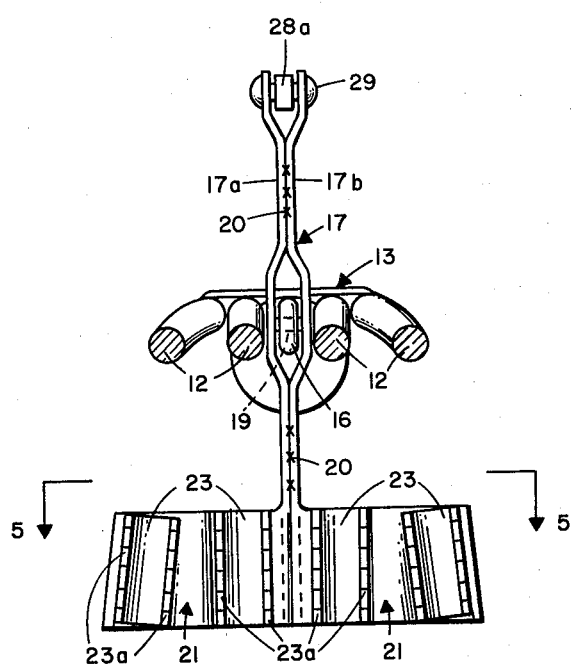
FIG. 4 is an enlarged sectional view taken transversely of the tines with the jaw partly open.
Figure 5:
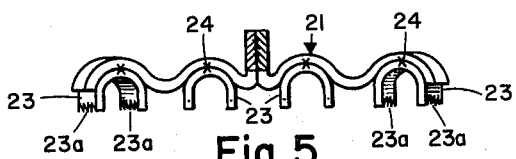
FIG. 5 is a fragmentary sectional view taken along line 5—5 of FIG. 4.

In the form of the invention illustrated in FIGS. 1 through 5 and described hereinafter, there is provided an improved soil cultivator and weed puller hand implement generally indicated at 10. The device 10 comprises an elongated handle 11 having a plurality of rigid pointed finger-like tines or prongs 12 secured at their base ends to an end 11b of the handle, which tines curve away from the longitudinal axis of the handle as shown in FIG. 1 and which diverge, as shown in FIG. 2, so that there is equal spacing between the points thereof. These tines are of sufficient strength to dig into and break up soil in the usual manner of a hand soil cultivator.

The base sections of tines 12 are secured to the handle 11 by a ferrule 13, preferably formed of sheet metal shaped to provide a socket portion 13a in which the end 11b of the handle is received, and a widened and flattened portion 13b in which the shank or base portions 12b of the tines 12 are received. The handle is conveniently secured in the socket portion 13a by a vertical rivet 14, while the tine portions 12b are similarly secured in the portion 13b of the ferrule 13 between the intermediate tines 12 to lend additional strength to the assembly.

The ferrule 13 has formed thereon an extension 16 projecting forwardly between the two intermediate tines 12 to provide pivotal support for a lever 17 which extends between the tines 12 and transversely of the longitudinal axis of the handle 11. The lever 17 is provided with a pair of lugs 18 projecting laterally from the medial portion of the lever and spaced to receive extension 16 therebetween. These lugs have aligned openings therethrough to receive a pivot pin 19 supported on extension 16. By this construction the main portion of the lever 17 is offset from the pivot pin 19 by the lugs 18 for a purpose which will presently be made apparent.

The lever 17 is preferably fabricated by a pair of identically but reversely formed sheet metal stampings 17a and 17b joined together by riveting or spot welding, as shown at 20 in FIG. 4, to form an integral unit having a central opening in the area of lugs 18 to receive extension 16 and a forked upper end, described hereinafter. The lower ends of each stamping 17a and 17b has a laterally extending section 21a, which sections combine to form a jaw portion 21 extending the width of the spread of the tines and having undulations corresponding in spacing and direction to the tines. The jaw portion 21 has secured thereto semi-tubular toothed members 23 U-shaped in cross section, which are fabricated of hardened steel strips curved about a longitudinal axis thereof. The closed sides of these members are nested in the concave undulations facing the tines and suitably secured therein, as by welding, with the open sides facing the tines when lever 17 is in the full line position shown in FIG. 1. These toothed members receive sections of the tines in nesting relation when in the last mentioned position and to provide good gripping action for the purpose described hereinafter, the sections of the tines received in the semi-tubular members are straightened so as to conform to the straight semi-tubular toothed members. The members 23 are provided each with serrations or teeth 23a cut in the two outwardly facing edges and preferably, the teeth are shaped to slope toward the anchored ends of tines 12 in saw-tooth fashion when in the full line position of FIG. 1. It will be seen that when the toothed members close against the tines with weeds therebetween, the weeds are partially wrapped around the tines by the curved surfaces of the members and are gripped by the teeth or serrated edges 23a.

The lever 17 is swung about its pivot pin 19 by a rod 28 pivotally connected thereto at one end 28a by a pin 29 which is supported in openings through the prongs of the forked end of the lever between which the rod 28 is received. Rod 28 extends along the handle 11 and its other end 28b is pivotally secured by a rivet 30 to one end of a sliding sleeve or grip 31 slidably mounted on the handle 11.

By sliding the grip 31 downwardly along the handle 11 toward end 11a thereof the lever 17 is rotated counter clockwise so that the jaw means 21 and toothed members 23 are swung away from the tines 12 to the dotted line position shown in FIG. 1, which is well out of the way of interfering with tines and the apparatus 10 may be used as a cultivator by working the tines 12 into the soil around plants, etc. in the usual manner. When weeds are encountered the pointed ends of the tines are lowered to the ground and placed immediately forward of the weeds with respect to the handle, and the grip 31 is then drawn toward end 11a of the handle 11 causing the lever 17 to swing clockwise, bringing the jaw means 21 toward the tines 12 so as to wedge the weeds therebetween with an upward or pulling component which dislodges the weeds from the soil, after which the weeds can be readily lifted by raising the implement. The weeds are relased by sliding the grip 31 downwardly to the original position described.

Referring now to FIG. 6, the nature of the force and movement characteristics which occur during the gripping of the weeds will be described. As shown, the jaw means 21, including toothed members 23, will follow a circle or arc of travel 35 about the pivot means 19 and approach and engage the straight sections of the tines at an angle of considerably less than 90°, thereby effecting a strong upward pull on weeds gathered between the jaw means and the tines. This movement results in an upward pulling action on the weeds by movement of the jaws aside from upward movement of the implement proper by handle 11. Thus, with the tines 12 resting on the ground and the gripping jaws of the lever 17 swinging toward the tines, the weeds caught up between the tines and jaws 21 can be dislodged from the soil by sliding grip 31, after which the weeds may be transported from their growing sites by easily lifting the implement with the weeds held to the tines.

Figure 7:
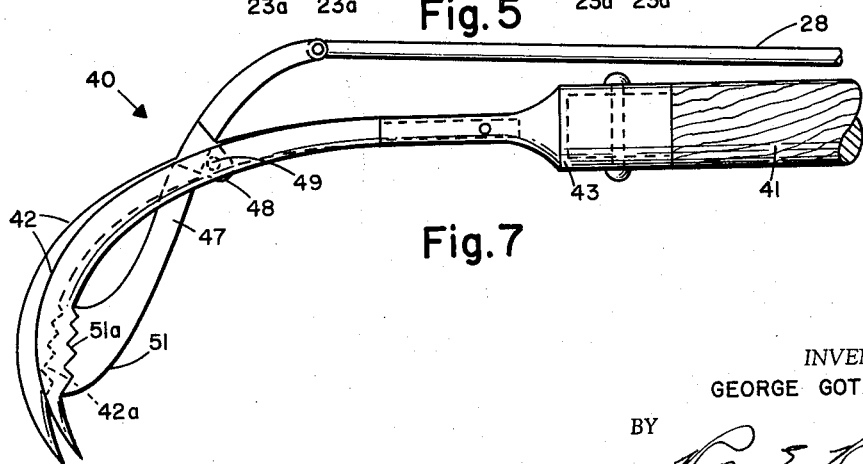
FIG. 7 is a side elevation of another embodiment of cultivator and weed puller embodying the invention.

Referring now to FIG. 7, there is illustrated a cultivator and weed puller implement 40 embodying a different form of the invention, the implement comprising a handle 41 and tines 42 secured to the handle 41 by ferrule means 43, and including a lever 47 having an offsetting lug 48 pivoted at 49, all of which may be similar to corresponding parts and constructions described relative to implement 10, except as more specifically described hereinafter. The tines 42 are provided with teeth 42a in the form of transversely extending ridges which are triangular in cross section and which receive therebetween teeth 51a similarly formed on a jaw portion 51 formed at the lower end of lever 47. The upper end of the lever 47 is pivoted to one end of an operating rod 58 at 59.

The operation of this embodiment of the invention will be readily understood from the description of the operation of the preceding embodiment. Thus, it will be recognized that the offset of lever 47 will produce a wedging action tending to move teeth 51a upwardly with meshing engagement with the teeth 42a. At the same time an increased component of force will be produced in a direction opposite to the reactionary pull of the weeds.

Although the invention has been described in considerable detail with reference to specific examples of weed pulling cultivators embodying the invention, it will be understood that the invention is not limited thereto, but rather the invention includes all those modifications, adaptations, substitutions, and uses as are reasonably embraced by the scope of the claims hereof.

Having described by invention, I claim:

1. A combination soil cultivator and weeder implement comprising an elongated handle having a plurality of soil penetrating tines secured to one end and which curve laterally of the longitudinal axis thereof, said tines being spaced apart laterally with respect to the handle, a lever, means pivoting said lever to said handle to swing about an axis extending transversely of the direction the soil penetrating sections of said tines extend, means forming gripping surfaces at one end of said lever comprising semi-tubular sections each having the open side thereof facing and aligned with the respective tines whereby said semi-tubular sections receive intermediate sections of said tines therein and grip weeds therebetween, said lever pivoting means being disposed to cause said lever to swing said gripping surfaces thereon about an arc approaching said tines from the soil working ends thereof at an angle thereto of appreciably less than 90° to thereby impart a substantial component of movement of said gripping surfaces longitudinally of said tines and away from the soil penetrating ends of the tines, and means to swing said lever about said pivot means to move said gripping surfaces to and from said tines.

2. A cultivator and weeder as defined in claim 1 in which said tines are generally curved away from said handle and each has a straightened section which is received within said semi-tubular sections, respectively.

References Cited by the Examiner

UNITED STATES PATENTS

| 149,676 | 4/1874 | Phelps | 294—50.9 |
|---|---|---|---|
| 1,262,755 | 4/1918 | Cutler | 172—378 X |
| 2,279,747 | 4/1942 | Brandeberry | 172—378 |
| 2,436,500 | 2/1948 | Anderson | 294—50.8 |

ABRAHAM G. STONE, *Primary Examiner.*

T. GRAHAM CRAVER, *Examiner.*